United States Patent [19]

Williams, Jr. et al.

[11] Patent Number: 5,450,064

[45] Date of Patent: Sep. 12, 1995

[54] MEDICAL ALERT PENDANT HOUSING CONSTRUCTION

[75] Inventors: Fred E. Williams, Jr., Arab; Rowland W. Kanner, Guntersville, both of Ala.

[73] Assignee: Ryder International Corporation, Arab, Ala.

[21] Appl. No.: 228,569

[22] Filed: Apr. 15, 1994

[51] Int. Cl.6 .............................................. H04B 1/034
[52] U.S. Cl. .................................... 340/574; 340/693; 341/176; 455/100
[58] Field of Search ....................... 340/574, 573, 693; 455/100; 341/176

[56] References Cited

U.S. PATENT DOCUMENTS 4,121,160 10/1978 Cataldo .................................. 455/100
4,491,970 1/1985 LaWhite et al. ....................... 455/100

*Primary Examiner*—Glen Swann
*Attorney, Agent, or Firm*—Trexler, Bushnell, Giangiorgi & Blackstone, Ltd.

[57] ABSTRACT

A medical alert pendant for use as a wireless remote actuation device in an emergency alarm system or the like includes a housing with a circuit board assembly and a resilient mounting and sealing membrane mounted therein. The housing includes an upper housing section which has an opening in the surface thereof, and a lower housing section. The circuit board assembly includes a power source, a signal transmitter and a depressible switch which activates the transmitter. The membrane is positioned between the housing sections and includes a flexible button which is disposed in the housing opening and juxtaposed to the switch on the circuit board assembly. The depression of the flexible button will operate the switch on the circuit board. The membrane includes a first peripheral seal which seals the juncture between the housing sections and a secondary seal which seals the opening in the upper housing section. The membrane includes a support structure for receiving and supporting the circuit board assembly between the respective housing sections. The membrane includes a flexible web portion which allows the membrane to flex to accommodate negative pressure in the housing without causing air or water vapor to be drawn into the housing.

22 Claims, 2 Drawing Sheets

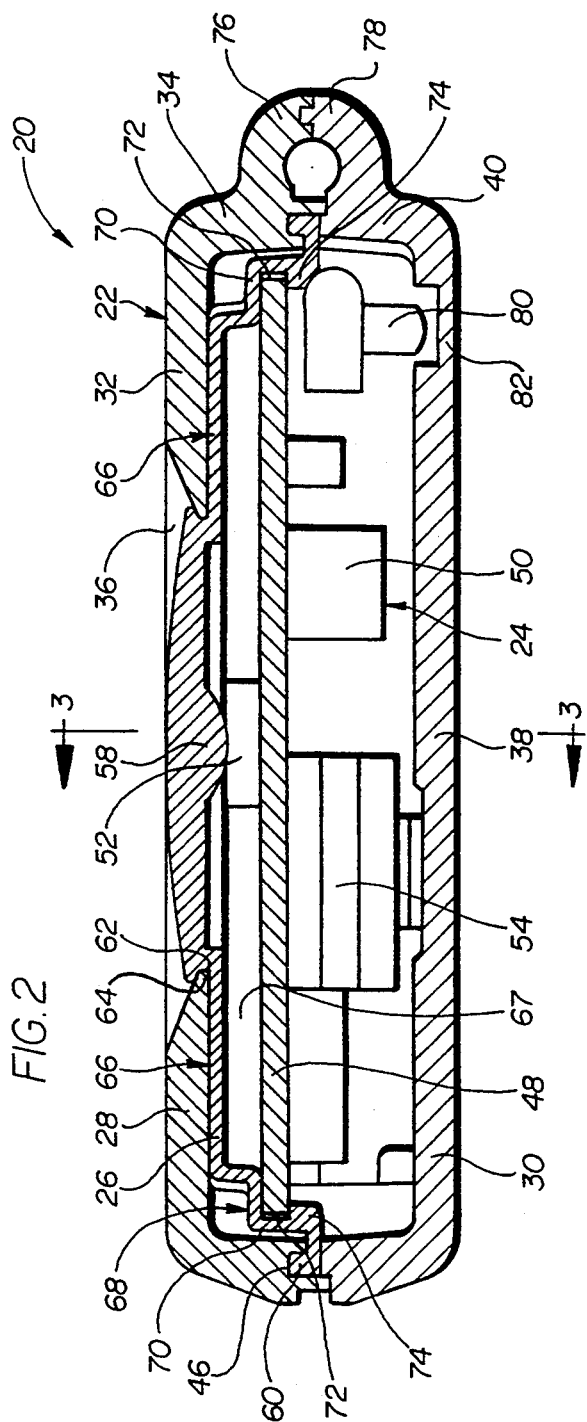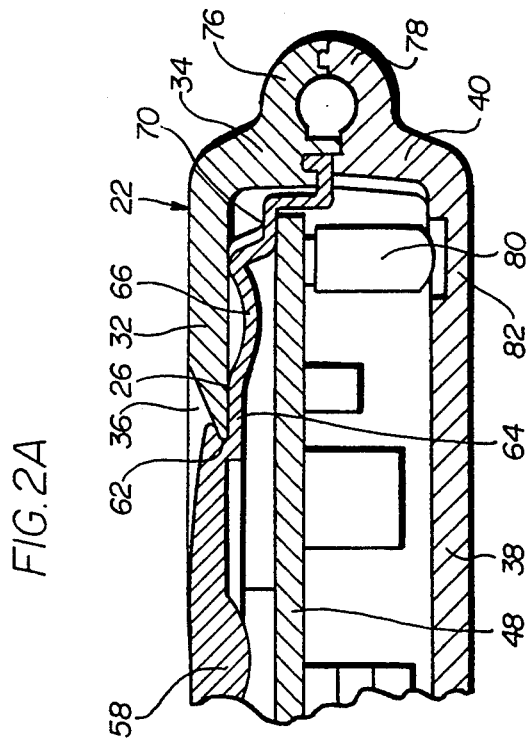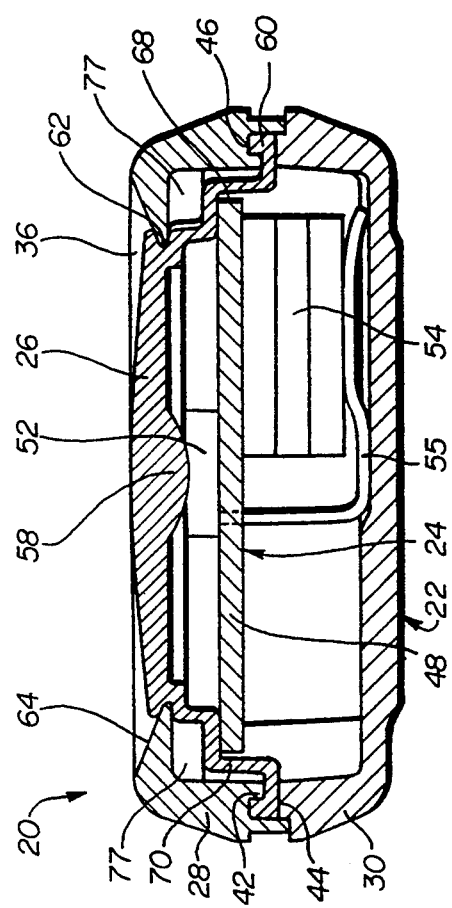

MEDICAL ALERT PENDANT HOUSING CONSTRUCTION

BACKGROUND OF THE INVENTION

This invention is generally directed to a medical alert pendant for use as a wireless remote actuation device in an emergency alarm system or the like. More particularly, the invention contemplates a sealed, waterproof housing construction for a medical alert pendant.

Emergency alarm systems provide monitoring of and response to the needs of elderly or infirmed persons confined to their residences. A medical alert pendant makes emergency care for the person accessible and allows the person to feel comfortable and secure in their home.

The elderly or infirmed person can wear the medical alert pendant on themselves, for example on their wrist, belt, or around their neck, or place it in an easily accessible area. If an emergency occurs, the person depresses a button on the medical alert pendant which activates a transmitter. The transmitter sends a signal to a receiving unit that will then automatically dial a monitoring number. Once the monitoring number receives the signal, they know that an emergency has arisen and they will have pre-assigned instructions as to who they should call, be it, for example, a doctor, fire department or an emergency unit.

Most medical alert pendants are not watertight and therefore cannot be worn or carried by a user in the bathtub or shower. The bathtub or shower is a frequent site of accidental falls and the accessibility of the medical alert pendant is important in summoning help. One example of an attempt to provide a waterproof medical alert pendant can be found in U.S. Pat. No. 4,491,970, which also vents the inner portion of the pendant relative to pressure change.

The medical alert pendant of the type and kind shown in U.S. Pat. No. 4,491,970 is designed to vent the inner portion or chamber of the housing wherein the electrical components are provided. The patent discloses a labyrinth type path to vent the interior of the housing to atmospheric pressure. Other types of vents could be used such as a port in the housing covered by a hydrophobic microporous membrane which would allow air pressure to be vented, yet prevent the entry of moisture. These designs, however, are subject to problems.

More specifically, since air can pass into or out of the housing, so can moisture vapor. Thus, should a negative pressure situation exist inside the housing, air or vapor can be sucked into the interior of the housing. When the air or vapor condenses, moisture will be introduced into the housing which can build up and short-circuit the electrical components within the housing. It should be noted that where a positive pressure exists, there is no danger that air or water vapor will be sucked or drawn into the interior of the pendant housing.

The present invention presents a novel medical alert pendant and housing structure that is intended to overcome this problem as well as to present several other advantages and improvements.

More specifically, the pendant housing construction of the present invention provides a sealed interface between the housing halves, which provides a primary seal. Also, a secondary seal is provided by the enlarged button portion of the sealing membrane being sealed to the aperture in the housing. Further, the membrane, as discussed hereinafter, is designed to accommodate negative pressure situations which tend to draw air or water vapor into the housing, that is where the pressure inside the housing is less than ambient. In this regard, as discussed hereinafter, the membrane includes a web portion that can flex or deform inwardly under negative pressure conditions, this flexing will decrease the chamber volume and precludes any tendency to draw or suck air or water vapor into the housing across the primary seal at the housing juncture.

OBJECTS AND SUMMARY OF THE INVENTION

A general object of the present invention is to provide a medical alert pendant for use as a wireless remote actuation device in an emergency alarm system.

An object of the present invention is to provide a medical alert pendant that is waterproof, and can also accommodate negative pressure changes.

Another object of the present invention is to provide a medical alert pendant that includes a resilient membrane therein for sealing the pendant to prevent the entrance of moisture therein, and also to flex inwardly to accommodate negative pressure situations.

A further object of the present invention to provide a medical alert pendant that includes a resilient membrane therein that cushions and supports a circuit board.

Briefly, and in accordance with the foregoing, the present invention discloses a medical alert pendant for use as a wireless remote actuation device in an emergency alarm system or the like. The medical alert pendant includes a housing with a circuit board assembly and a resilient mounting and sealing membrane mounted therein. The housing includes an upper housing section which has an opening in the surface thereof, and a lower housing section. The circuit board assembly includes a power source, a signal transmitter and a depressible switch which activates the transmitter. The membrane is positioned between the housing sections and includes a button portion which is disposed in the housing opening and juxtaposed to the switch on the circuit board assembly. The depression of the button will operate the switch on the circuit board. The membrane includes a first seal which seals the juncture between the housing sections and a secondary seal which seals the opening in the upper housing section. The membrane includes a support structure for receiving and supporting the circuit board assembly between the respective housing sections. Also, the membrane includes a flexible web portion surrounding, at least partially, the button portion to accommodate negative pressure situations.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 2 is a cross-sectional view of the medical alert pendant in a fully assembled configuration; and FIG. 2A is a partial cross-sectional view similar to FIG. 2, but showing the membrane flexed to accommodate a negative pressure situation.

FIG. 3 is a cross-sectional view of the medical alert pendant along 3—3 of FIG. 2.

DETAILED DESCRIPTION OF THE PREFERRED EMBODIMENT

Figure 1:
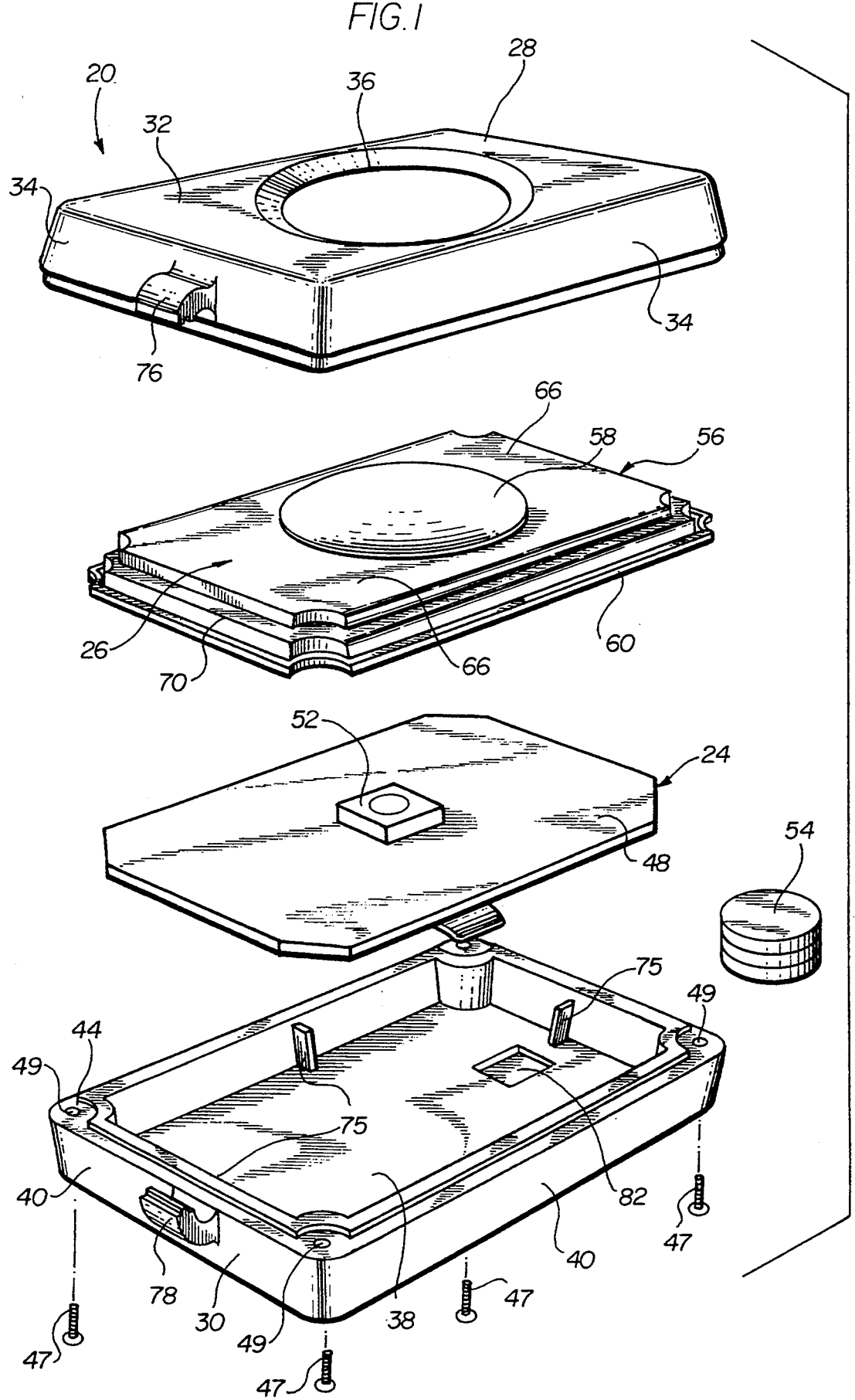
FIG. 1 is an exploded perspective view of an embodiment of the medical alert pendant of the present invention.

While the invention may be susceptible to embodiment in different forms, there is shown in the drawings, and herein will be described in detail, a specific embodiment of the present invention with the understanding that the present disclosure is to be considered an exemplification of the principles of the invention, and is not intended to limit the invention to that as illustrated and described herein.

A medical pendant, generally designated 20, is used as a wireless remote actuation device in an emergency alarm system or the like. The pendant 20 generally includes a housing 22, a circuit board assembly 24 and a resilient sealing and supporting membrane 26.

The housing 22 is generally of a square configuration, however, other shapes can be employed, and includes a first or upper housing section 28 and a second or lower housing section 30. The first housing section 28 includes a top wall 32 and side walls 34. The top wall 32 has an aperture or opening 36 therethrough, which, as illustrated, is circular. The second housing section 30 includes a bottom wall 38 and side walls 40. The housing sections 28, 30 are made of suitable materials, such as plastic, and made by known methods, such as molding.

The first and second housing sections 28, 30 are mated together at confronting faces 42, 44 of the respective side walls 34, 40. A recess 46 is formed along the confronting face 42 of the first housing section 28 for holding a portion or sealing edge or bead of the membrane 26 therein as described in detail hereinbelow. This recess 46, of course, could be provided in either housing section 28 or 30. The housing sections 28, 30 are secured to each other by suitable means, such as screws 47. The screws 47 are located in a position outside of the recess 46 so as to not interfere with the sealing action of the membrane 26 in that the screws 47 pass through openings 49 in the second housing section 30 and are engaged in corresponding apertures (not shown) formed in the first housing section 28.

The circuit board assembly 24 is mounted within the housing 22 as described in detail hereinbelow. The circuit board assembly 24 is of a known construction and generally includes a printed circuit board 48, a signal transmitter 50 connected to one side of the circuit board 48 and a depressible switch 52 mounted on the other side of the circuit board 48. A power source 54, such as batteries, is attached to the circuit board 48 by suitable known means, and includes a terminal member 55 as shown in FIG. 3.

The resilient membrane 26 is mounted within the housing 22 and performs a number of significant functions. First, the membrane 26 seals the housing 22 to prevent the entrance of moisture therein. Second, the membrane 26 provides a resilient shock absorbing support for the circuit board assembly 24 and mounts the circuit board assembly 24 within the housing 22. Further, the membrane 26 is constructed so that it can flex to accommodate negative pressure within the housing, without producing a tendency to suck or draw air or vapor across the housing sections interface.

The membrane 26 is made of a suitable flexible material, such as an elastomer, and is made of a main body portion 56 with a button portion 58 surrounded by a flexible web or panel portion 66, for specific purposes to be discussed. The button 58 is relatively thick, and while somewhat flexible, is more rigid than the remainder of the main body portion 56 defined by web 66. The button portion 56 extends through the opening 36 in the first housing section 28 and is shaped to conform to the opening 36. The flexible button 58 is juxtaposed to the switch 52 on the circuit board assembly 24 so that the medical alert pendant 20 will activate as described hereinbelow. Preferably, the button 58 lies relatively flush with the first housing section 28 so that the medical alert pendant 20 can be placed with the button side down, for example on a table, without the button 58 being depressed and the transmitter 50 activated.

The primary function of the membrane 26 is to seal the housing 22 and render it waterproof for use in the bathtub or shower. In this regard the membrane 26 provides sealing means with respect to the housing 22 to prevent the entrance of moisture into the housing 22 either through the opening 36 in the first housing section 28 or at the juncture between the housing sections 28, 30. The membrane 26 isolates the circuit board assembly 24 between the membrane 26 and the second housing section 30 so that moisture does not damage or corrode the components of the circuit board assembly 24.

The first seal seals the juncture between the housing sections 28, 30 to prevent the entrance of moisture therethrough. The peripheral edge portion 60 of the membrane 26 provides a sealing bead or rim and is sandwiched between the first housing section 28 and the second housing section 30 and is seated within the recess 46 provided in the first housing section 28.

The membrane also provides a second seal that seals the opening 36 in the first housing section 28. The main body portion 56 of the membrane 26 has an indented portion or annular recess 62 around the perimeter of the button portion 58 for accepting therein the edge 64 of the first housing section 28 which is defined by the opening 36. When the edge 64 is captured within the indented portion 62, the opening 36 is sealed and moisture cannot easily enter into the space between housing 22 and membrane 26 through the opening 36.

While this seal will be effective to keep out water under most conditions, it is not a hermetic seal against air and water vapor to the extent achieved by the sealing bead 60 and the primary seal at the juncture of the housing sections 28 and 30. Any air or vapor which may pass this second seal will be disposed between the membrane 26 and the upper housing 28. Due to the shape of the membrane 26 (FIG. 1) wherein the corners are notched to accommodate the fastener 47 and bores 49, any air or vapor which passes this second seal will be vented to the ambient as there is no hermetic seal at the corners of the housing exterior of the bead 60.

As noted above the membrane 26, with the sealing edge or bead 60 disposed in groove 46 provides a hermetic seal in that this bead 60 is compressed between the housing sections. Thus, the air enclosed by the membrane 26 and the lower housing section is not vented to atmosphere or the ambient. As such, due to temperature and atmospheric changes, a negative or positive pressure condition may exist with respect to the air trapped within the housing and the ambient air. Where the pressure is higher within the housing viz., a positive pressure condition, no leakage problems are encountered as the pressure differential will prevent air or water vapor from passing into the housing interior across the juncture of the housing sections 28 and 30. Where a negative pressure condition exists, however, viz., the pressure in the housing is less than that of the ambient atmosphere, there is a tendency to draw or suck air or water vapor across this juncture, notwithstanding the seal provided by the bead or rim 60.

To accommodate or handle the negative pressure conditions, the membrane includes the previously mentioned flexible web portion 66 disposed about or at least partially surrounding the thicker, less flexible button portion 58. As can be seen in FIG. 2, the web portion 66 is spaced from the circuit board 48 by a slight distance 67. When a negative pressure condition exists within the housing, the web portion 66 will flex inwardly, as indicated in FIG. 2A. This flexing of web portion 66, serves to reduce the volume of air in the chamber defined by membrane 26 and thus accommodates the negative pressure without causing air or water vapor to be drawn or sucked across the juncture of the housing sections 28 and 30. As such, this pressure differential condition is accommodated without the need for vent means, which could result in water developing within the housing due to condensation.

Under positive pressure conditions, the flexible web portion 66 will be forced into engagement with the inner wall face of the upper housing section 28 to enhance the secondary seal. If some moisture does enter the housing 22 through the opening 36, the moisture is prevented from contacting the circuit board assembly components because the components are isolated between the membrane 26 and the second housing section 30.

The membrane 26 also includes a support structure 68 for receiving and supporting the circuit board 48 within the housing 22. The support structure 68 cushions the circuit board 48 against shocks, if the medical alert pendant 20 is dropped or otherwise subjected to extreme forces. The main body portion 56 of the membrane 26 includes a shaped shoulder 70 which conforms to an edge portion 72 of the circuit board 48. The shaped shoulder 70 receives the edge portion 72 so as to support and to provide a cushioned mounting for the circuit board 48.

The support structure 68 further includes support fingers or members 74 on the main body portion 56 of the membrane 26 which overlie the edge of the circuit board 48 and in effect mount or hold the circuit board 48 in position relative to the membrane 26. The edge portion 72 of the circuit board 48 is sandwiched between the support fingers or members 74 and the shaped shoulder 70 to secure the circuit board 48 within the housing 22. As shown, the support members 74 are a plurality of tabs or fingers that receive and overlie the edge of the circuit board 48.

An advantage of having the support structure 68 is that the batteries can be changed, without upsetting the placement of or otherwise damaging the circuit board 48. To change the batteries, the second housing section 30 is detached from the first housing section 28 to allow the user access to the inside of the housing 22. When the second housing section 30 is detached, the circuit board 48 remains firmly seated within the housing 22 since it is held by the support structure 68.

In addition, the first and second housing sections 28 and 30 may be provided with a series of internal ribs or seats 75, as shown in FIG. 1, on the second housing section 30 and internal ribs or seats 77, as shown in FIG. 3, on the first housing section 28. The ribs or seats 75, 77 also serve to position the components of the pendant 20 properly.

Having described the components of the medical alert pendant 20, the operation of the pendant 20 will be briefly described. If an emergency occurs, the user depresses the flexible button 58 which causes the switch 52 on the circuit board assembly 24 to depress. The depression of the switch 52 activates the transmitter 50. The transmitter 50 sends a signal to a receiving unit (not shown), such as a telephone, that automatically dials a monitoring number. Once the monitoring number receives the signal, they know that an emergency situation has arisen and they will call the appropriate persons to help the person in need.

One feature of note is that each housing section 28, 30 may include half of a loop 76, 78, respectively, which connects together to form a complete loop when the housing sections 28, 30 are mated together. A user can thread a necklace through the loop so that the medical alert pendant 20 can be worn around the user's neck. It is within the scope of the invention that the medical alert pendant 20 include means for the user to wear the pendant 20 around or on their arm, wrist, belt or the like.

Another feature of note is that the medical alert pendant 20 may include a light emitting diode 80 which is connected to the circuit board 48 by suitable known means. The light emitting diode 80 is positioned proximate to a thin wall section 82 on the second housing section 30. When the switch 52 on the circuit board assembly 24 is depressed, the light emitting diode 80 will light up. Since the light emitting diode 80 is proximate to the thin wall section 82, the light from the diode will shine through the wall 82 and will notify the user that the pendant 20 has been activated.

While preferred embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. A remote signaling device for use in an emergency alarm system or the like, said device comprising:

a housing comprised of an upper housing section and a lower housing section, said upper housing section having an opening in the surface thereof;

a circuit board assembly mounted within said housing and including means for mounting a power source, signal generating means and depressible switch means to activate said signal generating means;

a resilient mounting and sealing membrane positioned between the housing sections and including a flexible button portion disposed in said housing opening and juxtaposed the switch means provided on said circuit board assembly such that depression of said button portion will operate said switch means; said resilient membrane including first, peripheral sealing means sealing the juncture between said housing sections, said membrane including support structure for receiving and supporting said circuit board assembly to provide a cushioned mounting for said circuit board assembly and provide for the mounting thereof between the respective housing sections.

2. A remote signaling device as defined in claim 1, wherein said circuit board assembly includes a circuit board; and said membrane support structure includes shoulders shaped to conform to the edges of the circuit board to support and cushion the circuit board within the housing and support members, the edges of the circuit board being sandwiched between the support members and the shoulders.

3. A remote signaling device as defined in claim 2, wherein said support members include a plurality of tabs.

4. A remote signaling device as defined in claim 1, wherein said first peripheral sealing means comprises a recess in said upper housing section, the peripheral edge of said membrane being captured within said recess and sandwiched between said first and second housing sections to form a first seal so as to prevent the entrance of moisture within said housing.

5. A remote signaling device as defined in claim 1, said resilient mounting and sealing membrane further including a second sealing means sealing the opening in said upper housing section and said opening defines an edge and wherein said second sealing means comprises an indentation in a body portion of said resilient membrane around said flexible button portion, said indentation capturing the edge of said opening therein and conforming thereto to form a second seal so as to prevent the entrance of moisture within said housing.

6. A remote signaling device as defined in claim 1, said circuit board assembly further including a light emitting diode which is activated when said flexible button portion is depressed; and
    said housing including a thin wall section, said thin wall section being proximate to said light emitting diode, said light emitting diode shining through said thin wall section when said diode is activated.

7. A remote signaling device as defined in claim 1, wherein said mounting and sealing membrane includes a flexible web portion disposed intermediate the button portion and the first, peripheral sealing means, which web portion can flex inwardly to accommodate a negative pressure condition.

8. A remote signaling device for actuation of an associated apparatus comprising:
    a housing having an opening in a face of the housing;
    a resilient membrane connected to said housing, said membrane forming a first seal and a second seal with said housing for preventing the entrance of moisture into said housing, said membrane including a body portion and an edge portion, said body portion including a flexible button portion thereon extending into said opening; and
    a circuit board contained within said housing, said circuit board having a depressible switch thereon, said depressible switch on said circuit board being juxtaposed with said flexible button portion and depressible to activate the remote signaling device in response to said flexible button portion being depressed.

9. A remote signaling device as defined in claim 8, wherein said housing includes a first section and a second section and the edge portion of the membrane is sandwiched between said first and second sections to form the first seal.

10. A remote signaling device as defined in claim 9, wherein said first section includes a recess therein around the perimeter of said first section, the edge portion of said membrane being captured within said recess to form the first seal.

11. A remote signaling device as defined in claim 9, wherein
    said membrane includes an indented portion around said flexible button portion, said indented portion capturing the edge of the opening therein to form said second seal.

12. A remote signaling device as defined in claim 8, wherein said membrane further includes means for connecting said circuit board to said membrane so that said circuit board is supported and cushioned within said housing.

13. A remote signaling device as defined in claim 12, wherein said means for connecting said circuit board to said membrane comprises shoulders in said membrane shaped to conform to the edges of the circuit board and a plurality of tabs, said circuit board being sandwiched between said tabs and said shoulders.

14. A remote signaling device as defined in claim 8, further including a light emitting diode connected to said circuit board, said light emitting diode being activated when said button portion is depressed and wherein said housing includes a recess therein to form a thin wall section, said thin wall section being proximate to said light emitting diode, said light emitting diode shining through said thin wall section when said diode is activated.

15. A remote signaling device according to claim 8, wherein said membrane includes a flexible web portion disposed about at least a segment of said flexible button portion, which web portion can flex inwardly to accommodate negative pressure conditions.

16. A remote signaling device for remote actuation of an emergency alarm system or the like, said device comprising:
    a housing comprised of a minimum of an upper housing section and a lower housing section, said upper housing section having an opening in the surface thereof;
    a circuit board assembly mounted within said housing and including means for mounting a power source, signal generating means and depressible switch means to activate said signal generating means;
    a resilient mounting and sealing membrane positioned between the housing sections and including a flexible button portion disposed in said housing opening and juxtaposed the switch means provided on said circuit board assembly such that depression of said button portion will operate said switch means; said resilient membrane including peripheral sealing means sealing the juncture between said housing sections and said membrane including support structure for receiving and supporting said circuit board assembly to provide a cushioned mounting for said circuit board assembly and provide for the mounting thereof between the respective housing sections.

17. A remote signaling device as defined in claim 16, wherein said membrane further includes additional sealing means for sealing the opening in said upper housing section.

18. A remote signaling device as defined in claim 16, wherein said circuit board assembly includes a circuit board; and
    said support structure of said membrane includes shoulders shaped to conform to the edges of the circuit board to support and cushion the circuit board within the housing.

19. A remote signaling device as defined in claim 16, wherein said membrane also includes a flexible web portion disposed between said button portion and said peripheral sealing means.

20. A remote signaling device for actuation of an associated apparatus comprising:
- a housing comprised of a minimum of an upper housing section and a lower housing section;
- a resilient membrane connected to said housing, said membrane forming a seal for sealing the juncture between said first and second housing sections for preventing the entrance of moisture into said housing; and
- a circuit board contained within said housing, said circuit board having a depressible switch thereon, said depressible switch on said circuit board being juxtaposed with said flexible membrane and depressible to activate the remote signaling device in response to said flexible membrane being depressed.

21. A remote signaling device as defined in claim 20, wherein said housing includes a first section and a second section and said membrane includes an edge portion, said edge portion of the membrane being sandwiched between said first and second sections to form the seal.

22. A remote signaling device as defined in claim 20, wherein said membrane further includes means for connecting said circuit board to said membrane so that said circuit board is supported and cushioned within said housing.

* * * * *